(12) United States Patent
Hattori et al.

(10) Patent No.: US 7,049,938 B2
(45) Date of Patent: May 23, 2006

(54) INTRA-VEHICLE LAN SYSTEM COMBINING ELECTRIC POWER SUPPLY

(75) Inventors: Yutaka Hattori, Kanagawa (JP); Yasuo Hatano, Kanagawa (JP)

(73) Assignee: The Yokohama Rubber Company, Ltd. (JP)

( * ) Notice: Subject to any disclaimer, the term of this patent is extended or adjusted under 35 U.S.C. 154(b) by 16 days.

(21) Appl. No.: 10/491,630

(22) PCT Filed: Oct. 3, 2002

(86) PCT No.: PCT/JP02/10338

§ 371 (c)(1),
(2), (4) Date: Apr. 2, 2004

(87) PCT Pub. No.: WO03/032674

PCT Pub. Date: Apr. 17, 2003

(65) Prior Publication Data

US 2004/0245854 A1    Dec. 9, 2004

(30) Foreign Application Priority Data

Oct. 4, 2001   (JP)   ............................. 2001-308389
Oct. 4, 2001   (JP)   ............................. 2001-308390

(51) Int. Cl.
*G05B 11/01*   (2006.01)

(52) U.S. Cl. ............................. 340/310.11; 340/10.52; 307/10.1

(58) Field of Classification Search ........... 340/310.11, 340/825.5, 539.1, 10.52, 825.72, 14.69; 307/10.1, 307/11
See application file for complete search history.

(56) References Cited

U.S. PATENT DOCUMENTS

| 4,584,487 | A | * | 4/1986 | Hesse et al. .................. 307/9.1 |
| 4,736,367 | A | * | 4/1988 | Wroblewski et al. ...... 340/3.51 |
| 4,942,571 | A | * | 7/1990 | Moller et al. ................ 370/407 |
| 4,956,561 | A | * | 9/1990 | Tamer ........................ 307/10.1 |
| 6,166,453 | A | * | 12/2000 | Kon'i et al. ................ 307/10.1 |

FOREIGN PATENT DOCUMENTS

| JP | 58-132893 A1 | 8/1983 |
| JP | 03-106294    | 5/1991 |
| JP | 04-101598 A  | 4/1992 |
| JP | 06-086461 A1 | 3/1994 |

OTHER PUBLICATIONS

International Search Report for PCT/JP02/10338 mailed on Jan. 21, 2003.
JPO Office Action mailed on May 31, 2005.
Japanese Patent Office, Office Action —Decision of Refusal, Application No.: JP 2001-308389, dated Sep. 6, 2005.

* cited by examiner

*Primary Examiner*—Phung T. Nguyen
(74) *Attorney, Agent, or Firm*—Rader, Fishman & Grauer PLLC

(57) ABSTRACT

An intra-vehicle LAN system combining electric power supply includes a main controller having control signal generation device for generating a control signal used to control each of on-vehicle electric equipments and outputting the control signal to an electric power supply line through which electric power is supplied to the electric equipments and an electric equipment control unit being provided between the electric power supply line and each of the electric equipments to detect the control signal transmitted through the electric power supply line and to control each of the electric equipments. In this system, the generated control signal contains an ID for specifying each of the electric equipments.

3 Claims, 4 Drawing Sheets

INTRA-VEHICLE LAN SYSTEM COMBINING ELECTRIC POWER SUPPLY

TECHNICAL FIELD

The present invention relates in general to an intra-vehicle LAN system combining electric power supply, and more particularly to a technique for simplifying electrical wiring through which signals used to control various kinds of on-vehicle units are transmitted and received in an automobile.

BACKGROUND ART

An electrical part or component (on-vehicle unit) such as a light (illuminant), a warning lamp or an air conditioner of an automobile is manipulated by depressing a corresponding one of the switches installed on a panel of a driver's seat. Conventionally, in order to transmit commands to on-vehicle units through these switches, a lot of signal lines were arranged in a vehicle. In addition, electric power supply lines for supply of electric power used to drive the on-vehicle units were also arranged separately from these signal lines. The wiring is bundled together and is called a wire harness.

In recent years, however, the number of on-vehicle units with which an automobile is loaded has been increased year by year with the advance of the technology concerned with a car navigation system, an on-vehicle audio system or a TV. Thus, the number of signal lines and electric power supply lines used in these on-vehicle units has been increased accordingly. Hence, a diameter of the wire harness into which the signal lines and the electric power supply lines are bundled has also been increased, and a weight of the wire harness has also been increased. As a result, a problem arises in that it becomes difficult to ensure a wiring space, a rate of fuel consumption of an automobile is made worse due to an increase in weight, and so forth.

In addition, there also arises a problem in that a very hard work is required for drawing signal lines for electric equipment from a wire harness into which an enormous number of signal lines and electric power supply lines are bundled and connecting these lines in the vicinities of the electric equipment.

DISCLOSURE OF THE INVENTION

The present invention has been made in the light of the above-mentioned problems associated with the prior art, and it is, therefore, an object of the present invention to provide an intra-vehicle LAN system combining electric power supply with which electrical wiring in an automobile is simplified and which is capable of reduction in vehicle weight, facilitation of its manufacturing process and reduction in cost through the reduction in the electrical wiring in the automobile.

In order to solve the above-mentioned object, a first aspect of the present invention provides an intra-vehicle LAN system combining electric power supply, characterized by including: a main controller having control signal generation means for generating a control signal containing an ID used to control a corresponding one of on-vehicle electric equipments and outputting the control signal to an electric power supply line through which electric power is supplied to each of the electric equipments; and an electric equipment control unit being provided between the electric power supply line and each electric equipment to detect the control signal containing the ID transmitted through the electric power supply line and to control each electric equipment.

In this case, it is preferable that the electric equipment control unit includes: signal detection means for detecting the control signal transmitted through the electric power supply line; a control switch adapted to control a corresponding one of the electric equipments in accordance with the detected control signal; detection means for detecting a control state of the corresponding one of the electric equipments; and state signal generation means for generating a state signal corresponding to the detected control state of the corresponding one of the electric equipments and outputting the state signal to the electric power supply line towards the main controller side.

Also, in order to solve the above-mentioned object, a second aspect of the present invention provides an intra-vehicle LAN system combining electric power supply, characterized by including: a main controller having control signal generation means for generating a control signal used to control a corresponding one of on-vehicle electric equipments and outputting the control signal to an electric power supply line through which electric power is supplied to each of the electric equipments; an electric equipment control unit that includes a transmitter having a unit for adding an ID, the transmitter being connected to the electric power supply line near each electric equipment, detects the control signal transmitted through the electric power supply line and adds the ID to the control signal to transmit the resultant signal in a wireless manner; a receiver provided in each electric equipment and having a unit for receiving the control signal transmitted in a wireless manner from the transmitter and identifying the ID added to the control signal; and a control switch provided in each electric equipment and adapted to control a corresponding one of the electric equipments in accordance with the control signal received by the receiver.

In this case, it is preferable that the electric equipment control unit further includes: detection means for detecting a control state of the corresponding one of the electric equipments; and state signal generation means for generating a state signal corresponding to the detected control state of the corresponding one of the electric equipments and outputting the state signal to the electric power supply line towards the main controller side.

BEST MODE FOR CARRYING OUT THE INVENTION

An intra-vehicle LAN system combining electric power supply according to the present invention will hereinafter be described in detail on the basis of preferred embodiments shown in the accompanying drawings.

First of all, an intra-vehicle LAN system combining electric power supply according to a first aspect of the present invention will now be described with reference to FIGS. 1 and 2.

Figure 1:
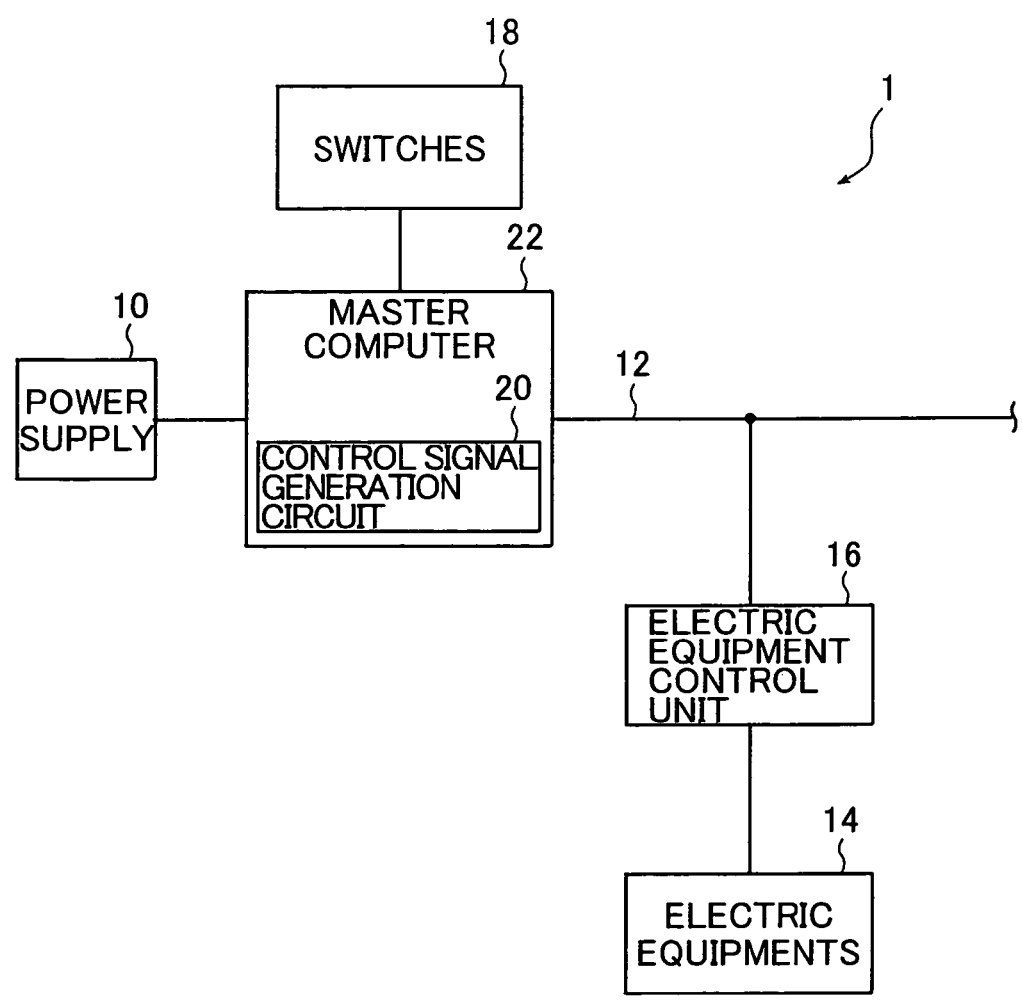
FIG. 1 is a block diagram showing a schematic configuration of an embodiment of an intra-vehicle LAN system combining electric power supply according to the present invention.

FIG. 1 is a block diagram showing a schematic configuration of an embodiment of the intra-vehicle LAN system combining electric power supply according to the first aspect of the present invention.

The intra-vehicle LAN system combining electric power supply according to this embodiment transmits instructions (control signals) which were inputted from switches provided in the vicinity of a driver's seat and which are used to manipulate (control) electric equipment to the electric equipment through electric power supply lines through which driving electric power is supplied to the electric equipment, whereby signal lines which have been conventionally necessary are removed to reduce the number of intra-vehicle wiring to attain simplification.

As shown in FIG. 1, an intra-vehicle LAN system 1 combining electric power supply of this embodiment mainly includes: various kinds of electric equipment 14 connected to an electric power supply line 12 such as a copper line which, for example, is arranged in a loop from a power supply 10 substantially along the outer periphery within a vehicle; an electric equipment control unit 16 for receiving control signals for the various kinds of electric equipment 14 to control the various kinds of electric equipment 14; and a master computer 22 including a control signal generation circuit 20 for receiving input signals from the switches 18 and sending the control signals for the various kinds of electric equipment 14 to the electric power supply line 12.

While an installation place of the master computer 22 is not especially limited, the master computer 22 is installed in the vicinity of a driver's seat for example. When an instruction to manipulate a corresponding one of the electric equipment 14 is issued from a corresponding one of the switches 18 provided in the vicinity of the driver's seat to be inputted to the master computer 22, the master computer 22 receives the instruction, judges for which of the electric equipment 14 the instruction is issued, and instructs the control signal generation circuit 20 to generate a control signal containing an ID for the electric equipment 14 which was instructed to be manipulated to send the control signal to the electric power supply line 12.

Normally, electrical power having a voltage of 12 V is supplied to the electric equipment 14 through the electric power supply line 12. Then, when a control signal is sent from the control signal generation circuit 20, the electric power supply line 12 transmits the control signal simultaneously with driving electric power for a corresponding one of the electric equipment 14 to the corresponding one of the electric equipment 14.

The electric equipment control unit 16 is supplied with the electric power through the electric power supply line 12 and concurrently detects the control signal containing an ID sent together with the electric power. Upon detection of the control signal, the electric equipment control unit 16 opens a power supply opening/closing switch (which will be described later) for a corresponding one of the electric equipment 14 to supply the corresponding one of the electric equipment 14 with electric power to drive the corresponding one of the electric equipment 14.

Since the control signals for the electric equipment are transmitted through the electric power supply line, conventional signal lines can be made unnecessary, so that the number of electrical wiring in a vehicle is reduced to attain simplification. This will hereinafter be described in more detail with reference to FIG. 2.

Figure 2:
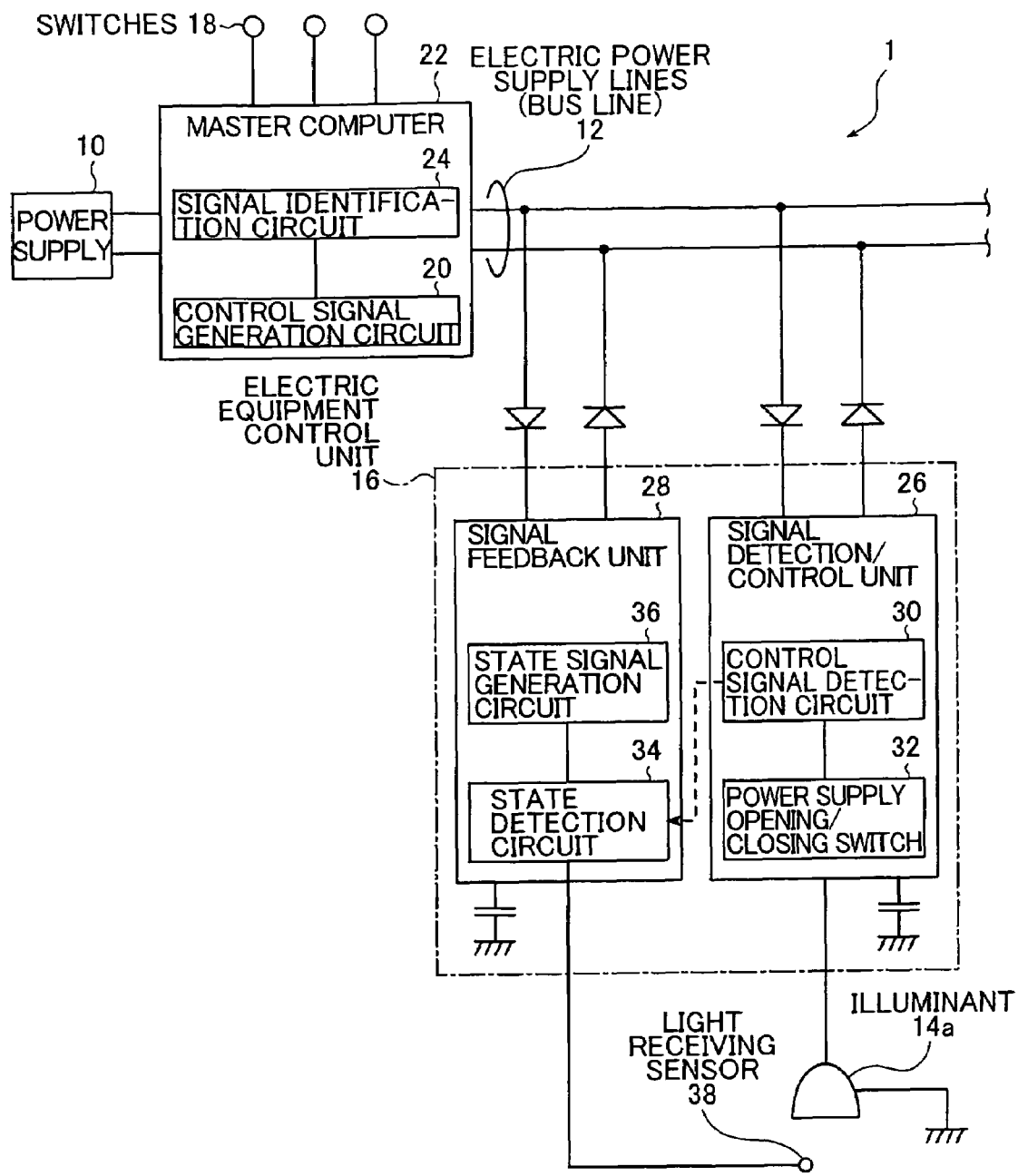
FIG. 2 is a block diagram showing the intra-vehicle LAN system shown in FIG. 1 in more detail.

FIG. 2 is a block diagram showing the intra-vehicle LAN system 1 combining electric power supply of this embodiment shown in FIG. 1 in more detail.

In FIG. 2, a configuration of the system including: the power supply 10; the electric power supply line (bus line) 12; the electric equipment (in this case, especially an illuminant 14a is used as an example); the electric equipment control unit 16; the control signal generation circuit 20; and the master computer 22 is substantially the same as that shown in FIG. 1.

The master computer 22 includes a signal identification circuit 24 for receiving a manipulation instruction signal issued from a corresponding one of the switches 18 to judge for which of the electric equipment 14 the manipulation instruction signal is issued, and the control signal generation circuit 20 for generating control signals containing IDs for the electric equipment 14, respectively.

Here, the signal identification circuit 24 not only identifies for which of the electric equipment 14 the instruction is issued, but also identifies the instruction contents, e.g., in case of a light, judges whether the light concerned is a small light or a headlight, or in case of a wiper, judges control contents (mode) concerned, for example, which mode is used, low speed, middle speed or high speed.

Note that the control signal generation circuit 20 may be provided for each switch (each electric equipment 14) in place of installing the signal identification circuit 24 in such a manner.

The control signal generation circuit 20 generates a control signal containing an ID for a corresponding one of the electric equipment 14 to which an instruction is issued from a corresponding one of the switches 18, and sends the control signal thus generated to the electric power supply line 12. The generated control signal contains a code (ID) for specifying the electric equipment 14 concerned. In this connection, a pulse period is determined in advance for each electric equipment 14. It may safely be said that a method of transmitting control signals of the electric equipment 14 through the electric power supply line 12 is the same as, for example, that in a DSL (Digital Subscriber Line) in which data communication is carried out with information being transmitted through a telephone line.

In this embodiment, description will now be given by taking an illuminant 14a as a typical example of the electric equipment 14 with reference to FIG. 2.

The electric equipment control unit 16 includes a signal detection/control unit 26 and a signal feedback unit 28. The signal detection/control unit 26 has a control signal detection circuit 30 and a power supply opening/closing switch (control switch) 32 to which the illuminant 14a is connected. In addition, the signal feedback unit 28 has a state detection circuit 34 and a state signal generation circuit 36. A light receiving sensor 38 for detecting light emission from the illuminant 14a is connected to the state detection circuit 34.

The control signal detection circuit 30 detects a control signal containing an ID for the electric equipment 14 (the illuminant 14a in this case) from an electrical signal inputted through the electric power supply line 12. Upon detection of the control signal containing the ID for the illuminant 14a, the control signal detection circuit 30 sends a signal to the power supply opening/closing switch 32 to close the power supply opening/closing switch 32 so that electric power is supplied to the illuminant 14a to turn on the illuminant 14a.

When the illuminant 14a is turned on, the light receiving sensor 38 receives light emitted from the illuminant 14a, and a detection signal exhibiting reception of the light is then inputted to the state detection circuit 34. The state detection circuit 34 detects a lighting state of the illuminant 14a from the detection signal.

That is to say, the state detection circuit 34 judges whether or not the electric equipment 14 (illuminant 14a) is controlled in a state as instructed. Note that in carrying out this judgment, the results of detection made by the control signal detection circuit 30 of the signal detection/control circuit 26 may be utilized for the contents of the instruction issued for the electric equipment 14.

The intra-vehicle LAN system combining electric power supply according to the first aspect of the present invention is basically configured as described above.

Next, an intra-vehicle LAN system combining electric power supply according to a second aspect of the present invention will be described with reference to FIGS. 3 and 4.

Figure 3:
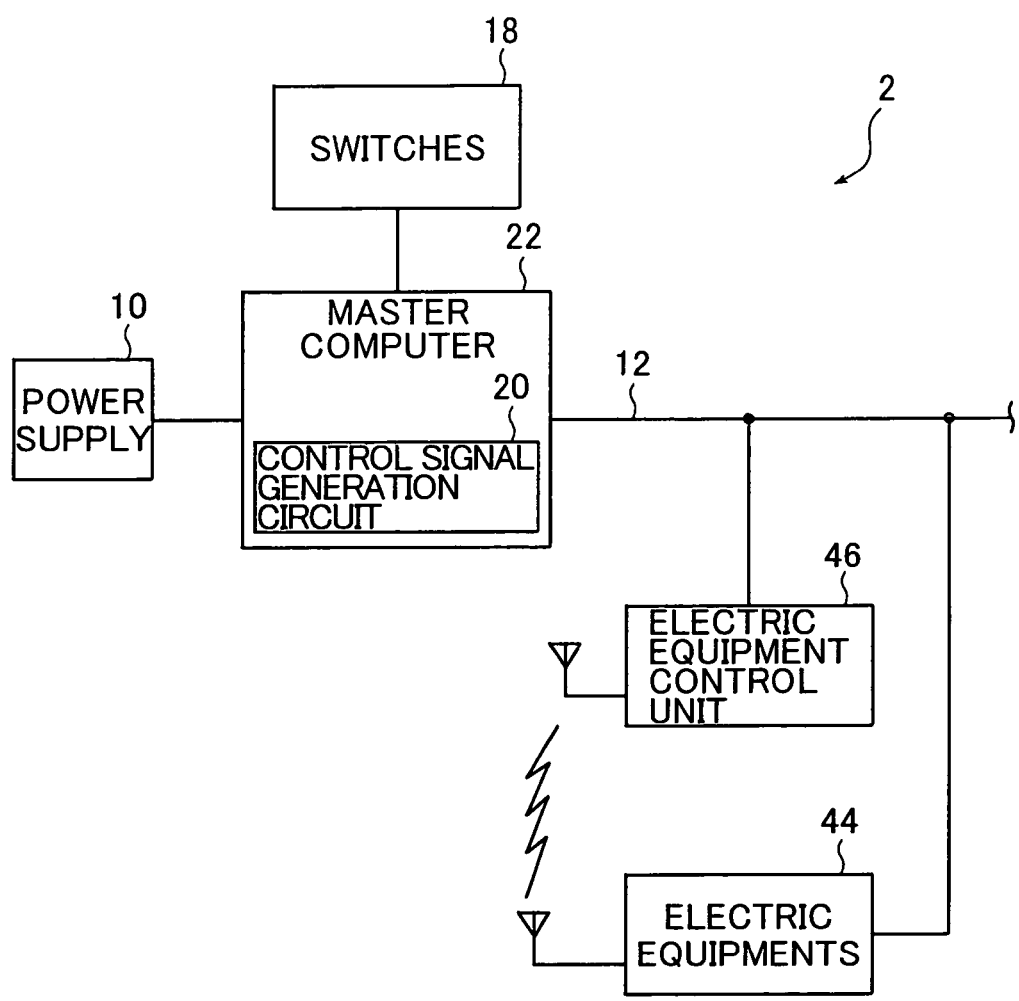
FIG. 3 is a block diagram showing a schematic configuration of another embodiment of the intra-vehicle LAN system combining electric power supply according to the present invention.

FIG. 3 is a block diagram showing a schematic configuration of an embodiment of the intra-vehicle LAN system combining electric power supply according to the second aspect of the present invention.

The intra-vehicle LAN system combining electric power supply according to this embodiment is designed such that an instruction (control signal) which was inputted from a corresponding one of the switches provided in the vicinity of a driver's seat to manipulate (control) a corresponding one of the electric equipment is transmitted to the corresponding one of the electric equipment through the electric power supply line through which driving electric power is supplied to the electric equipment, and the electric equipment control unit provided in the vicinity of a corresponding one of the electric equipment detects this control signal and transmits this control signal in a wireless manner to the corresponding one of the electric equipment in order to control the corresponding one of the electric equipment.

Figure 4:
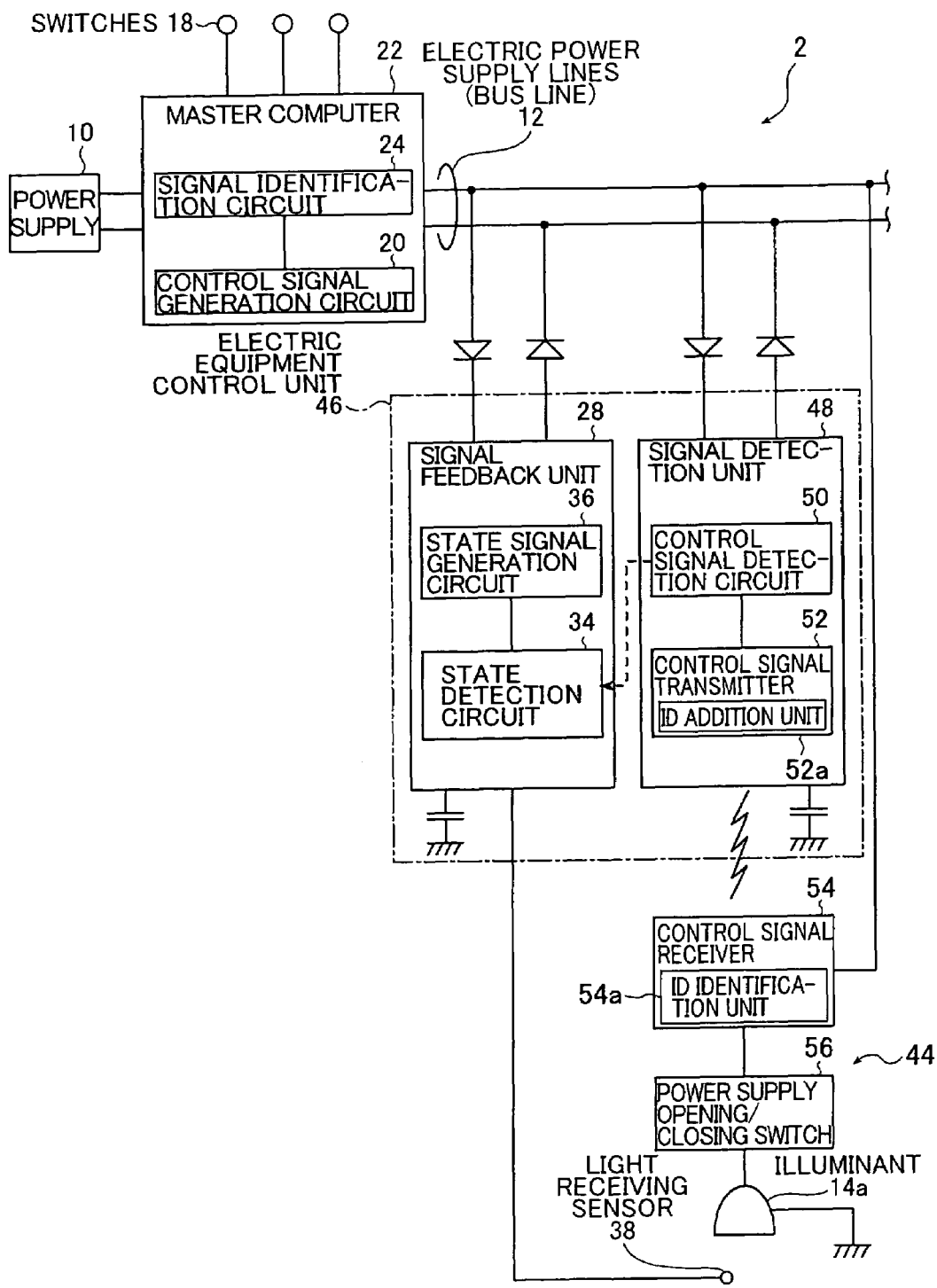
FIG. 4 is a block diagram showing the intra-vehicle LAN system shown in FIG. 3 in more detail.

Here, an intra-vehicle LAN system 2 combining electric power supply shown in FIGS. 3 and 4 has basically the same configuration as that of the intra-vehicle LAN system 1 combining electric power supply shown in FIGS. 1 and 2 except that configurations of electric equipment 44 and an electric equipment control unit 46 are different from those of the electric equipment 14 and the electric equipment control unit 16. Hence, the same constituent elements are designated with the same reference numerals and detailed description thereof is omitted here.

As shown in FIG. 3, the intra-vehicle LAN system 2 combining electric power supply of this embodiment mainly includes: an electric power supply line 12 such as a copper line which, for example, is arranged in a loop from a power supply 10 substantially along the outer periphery within a vehicle; various kinds of electric equipment 44 connected to the electric power supply line 12; an electric equipment control unit 46 for detecting control signals for the various kinds of electric equipment 44 and sending the control signals to the various electric equipment 44 to control the various kinds of electric equipment 44; and a master computer 22 including a control signal generation circuit 20 for receiving input signals from the switches 18 and sending the control signals for the various kinds of electric equipment 44 to the electric power supply line 12.

As in the first aspect described above, when an instruction to manipulate a corresponding one of the electric equipment 44 is issued from a corresponding one of the switches 18, the master computer 22 receives the instruction to judge for which of the electric equipment 44 the instruction is issued, and instructs the control signal generation circuit 20 to generate a control signal for the electric equipment 44 which was instructed to be manipulated to send the control signal to the electric power supply line 12.

As in the first aspect described above, when a control signal is sent from the control signal generation circuit 20, the electric power supply line 12 transmits the control signal simultaneously with driving electric power for a corresponding one of the electric equipment 44 to the corresponding one of the electric equipment 44.

The electric equipment control unit 46 is supplied with the electric power through the electric power supply line 12 and concurrently detects the control signal sent together with the electric power. Upon detection of the control signal, the electric equipment control unit 46 opens a power supply opening/closing switch (which will be described later) for a corresponding one of the electric equipment 44 to supply the corresponding one of the electric equipment 44 with electric power to drive the corresponding one of the electric equipment 44.

Each of the electric equipment 44 receives a control signal which is transmitted in a wireless manner to turn on the power supply opening/closing switch and starts the operation.

Since the control signals for the electric equipment 44 are transmitted through the electric power supply line 12 as described above, conventional signal lines can be made unnecessary, so that the number of electrical wiring in a vehicle is reduced to attain simplification. This will hereinafter be described in more detail with reference to FIG. 4.

FIG. 4 is a block diagram showing the intra-vehicle LAN system 2 combining electric power supply of this embodiment shown in FIG. 3 in more detail.

In FIG. 4, description will be given by taking the illuminant 14a (including its ON/OFF device) as a typical example of the electric equipment 44. As shown in FIG. 4, the system 2 mainly includes: the power supply 10; the electric power supply line (bus line) 12; the electric equipment 44 (the illuminant 14a); the electric equipment control unit 46; and the master computer (main controller) 22.

As in the first aspect described above, the master computer 22 includes the signal identification circuit 24 for receiving a manipulation instruction signal issued from a corresponding one of the switches 18 to judge for which of the electric equipment 44 the manipulation instruction signal is issued, and the control signal generation circuit 20 for generating control signals for the electric equipment 44, respectively.

Here, as in the above, the signal identification circuit 24 not only identifies for which of the electric equipment 44 the instruction is issued, but also judges instruction contents.

Note that, in this embodiment, as in the first aspect, the control signal generation circuit 20 may be provided for each switch (each electric equipment 44) in place of installing the signal identification circuit 24 in such a manner.

As in the first aspect, the control signal generation circuit 20 generates a control signal for a corresponding one of the electric equipment 44 to which an instruction is issued from a corresponding one of the switches 18, and sends the control signal thus generated to the electric power supply line 12. Also in this embodiment, the generated control signal contains a code (it may be an ID) for specifying the electric equipment 44 concerned. In this connection, a pulse period is determined in advance for each electric equipment 44.

In this embodiment, description will be given by taking the illuminant 14a (including its NO/OFF device) as a typical example of the electric equipment 44 with reference to FIG. 4.

The electric equipment control unit 46 includes a signal detection unit 48 and the signal feedback unit 28. The signal detection unit 48 has a control signal detection circuit 50 and a control signal transmitter 52. The signal feedback unit 28, similarly to the first aspect, has the state detection circuit 34 and the state signal generation circuit 36. In addition, the illuminant 14*a* as the electric equipment 44 is provided with a control signal receiver 54 and a power supply opening/closing switch 56, and also the light receiving sensor 38 is installed in the vicinity of the illuminant 14*a*. As in the above-mentioned first aspect, a detection signal of the light receiving sensor 38 is inputted to the state detection circuit 34. A lighting state of the illuminant 14*a* is detected on the basis of this detection signal in the state detection circuit 34.

The control signal detection circuit 50 detects a control signal for the electric equipment 44 (illuminant 14*a*) from the electrical signal inputted through the electric power supply line 12. Upon detection of the control signal for the illuminant 14*a*, the control signal detection circuit 50 transmits the control signal in a wireless manner from the control signal transmitter 52 towards the illuminant 14*a*. In addition, the control signal transmitter 52 has an ID addition unit 52*a*, and hence adds an ID for identification of the illuminant 14*a* to the above-mentioned control signal to transmit the resultant signal. It should be noted that if an ID included as a code for identification of the illuminant 14*a* in the control signal generated by the control signal generation circuit 20 can be utilized, then this ID may be used as an ID which, for identification of the illuminant 14*a*, is added to the control signal transmitted in a wireless manner from the control signal transmitter 52 towards the illuminant 14*a*. In this case, the control signal transmitter 52 may not be especially provided with the ID addition unit 52*a*.

The control signal receiver 54 provided to the illuminant 14*a* has an ID identification unit 54*a*. Upon reception of the control signal which is transmitted in a wireless manner from the control signal transmitter 52 of the signal detection unit 48, the ID identification unit 54*a* identifies an ID added to the control signal and turns on the power supply opening/closing switch 56 to supply the illuminant 14*a* with electric power to thereby turn on the illuminant 14*a*. At this time, in accordance with the contents of the control signal, a predetermined power supply switch for turning on a small light or a headlight is turned on.

When the illuminant 14*a* is turned on, the light receiving sensor 38 receives light emitted from the illuminant 14*a*, and a signal exhibiting reception of the light is then inputted to the state detection circuit 34. The state detection circuit 34 judges a lighting state of the illuminant 14*a* from the input signal.

That is to say, the state detection circuit 34 judges whether or not the illuminant 14*a* is controlled in a state as instructed. Note that in carrying out this judgment, the results of detection made by the control signal detection circuit 50 of the signal detection unit 48 may be utilized for the contents of the instruction issued for the electric equipment 44 (illuminant 14*a*).

As in the above-mentioned first aspect, the state signal generation circuit 36 generates a state signal corresponding to a state of the illuminant 14*a* detected by the state detection circuit 34. The generated state signal is then sent to the electric power supply line 12. Then, the state signal exhibiting a control state (lighting state) of the illuminant 14*a* is transmitted (fed back) to the master computer 22 through the electric power supply line 12.

As described above, in this embodiment, the control signal used to control a corresponding one of the electric equipment is sent through the electric power supply line to be detected by the signal detection unit provided in the vicinity of the corresponding one of the electric equipment, and the control signal is then transmitted through wireless communication to the corresponding one of the electric equipment to control the corresponding one of the electric equipment.

Sending the control signal through the electric power supply line as described above eliminates the need for any of signal lines through which control signals are sent to the respective electric equipment. In addition, in a unit for finally transmitting the control signal sent through the electric power supply line to a corresponding one of the electric equipment, the control signal is transmitted through the wireless communication, whereby it is possible to increase the degree of freedom of installation of the electric equipment and the like, and hence mounting becomes easy.

The intra-vehicle LAN system combining electric power supply according to the second aspect of the present invention is basically configured as described above.

While the above-mentioned embodiments are specific cases where the illuminant 14*a* is used as the electric equipment 14 and 44, the present invention is also applied to cases of other electric equipment as well. For example, in case of a wiper, the motion of the wiper is detected by a predetermined sensor to judge using the detection signal whether or not the wiper is operated in a state as instructed, and a state signal corresponding to the judgment is also generated to be fed back to the master computer 22. The master computer 22, after reception of the fed-back state signal, displays information on a state of the electric equipment on an installation panel. While in case of a front glass, the wiper is seen from a driver's seat, in case of a rear window, the wiper is seen with difficulty. Thus, it is effective to display information on the operation state of the electric equipment on the installation panel in such a manner. In addition, if there is some abnormality in the operation of the electric equipment, then this effect is displayed on the installation panel to urge a driver to pay attention to the operation of the electric equipment.

In addition, the two signals, i.e., the control signal (so-called the down signal) from the master computer 22 towards the electric equipment 14 or 44, and the state signal (so-called the up signal) from the electric equipment control unit 16 or 46 towards the master computer 22 are transmitted through the electric power supply line 12, respectively. In this connection, a pulse period of the control signal is set higher than that of the state signal.

In controlling the electric equipment 14 and 44, the two signals, i.e., the signal (down signal) used to control the electric equipment 14 and 44, and the signal (up signal) for feedback are used in pairs as described above, whereby it becomes possible to more accurately control the electric equipment 14 and 44.

Since the signals are transmitted through the electric power supply line as described above, conventional signal lines can be made unnecessary, so that the number of electrical wiring in a vehicle is reduced to attain simplification.

Consequently, such a troublesome work as to draw the signal lines of the electric equipment from the wire harness in the electric equipment to connect the drawn signal lines as in the prior art becomes unnecessary. Hence, the manufacturing process also becomes easy, and a cost is also reduced.

Since the signals are transmitted through the electric power supply line as described above, conventional signal lines can be made unnecessary to reduce the number of electrical wiring in a vehicle is reduced to attain simplification.

Consequently, such a troublesome work as to draw the signal lines of the electric equipment from the wire harness in the electric equipment to connect the drawn signal lines as in the prior art becomes unnecessary. Hence, the manufacturing process also becomes easy, and a cost is also reduced. In particular, in the second aspect, the control signal is transmitted through the wireless communication in a portion of each electric equipment, and therefore these effects are large.

The intra-vehicle LAN system combining electric power supply of the present invention has been described above in detail with reference to various embodiments. However, it is to be understood that the present invention is not intended to be limited to the above-mentioned embodiments, and hence various improvements or changes may also be made without departing from the subject matter of the present invention.

INDUSTRIAL APPLICABILITY

As is described above, according to the present invention, since the signals are transmitted through the electric power supply line, conventional signal lines can be made unnecessary, so that the number of electrical wiring in a vehicle is reduced to attain simplification. In addition, reduction of vehicle weight, facilitation of the manufacturing process, and reduction in cost can be realized.

In particular, according to the second aspect of the present invention, since the signals are transmitted to the electric equipment in a wireless manner in each part of the electric equipment, conventional signal lines can be made unnecessary, so that the number of electrical wiring in a vehicle is reduced to attain simplification. In addition, reduction of vehicle weight, facilitation of the manufacturing process, and reduction in cost can be realized.

The invention claimed is:

1. An intra-vehicle LAN system combining electric power supply, comprising:
   a main controller having control signal generation means for generating a control signal containing an ID used to control each of on-vehicle electric equipments and outputting said control signal to an electric power supply line through which electric power is supplied to each of said electric equipments; and
   an electric equipment control unit being provided between said electric power supply line and each of said electric equipments to detect said control signal containing said ID transmitted through said electric power supply line and to control each of said electric equipments,
   wherein said electric equipment control unit comprises:
   signal detection means for detecting said control signal transmitted through said electric power supply line;
   a control switch adapted to control each of said electric equipments in accordance with said detected control signal;
   detection means for detecting a control state of each of said electric equipments; and
   state signal generation means for generating a state signal corresponding to said detected control state of each of said electric equipments and outputting said state signal to said electric power supply line towards a side of said main controller.

2. An intra-vehicle LAN system combining electric power supply, comprising:
   a main controller having control signal generation means for generating a control signal used to control each of on-vehicle electric equipments and outputting said control signal to an electric power supply line through which electric power is supplied to each of said electric equipments;
   an electric equipment control unit that includes a transmitter having a unit for adding an ID, said transmitter being connected to said electric power supply line near each of said electric equipments, detects said control signal transmitted through said electric power supply line and adds said ID to said control signal to transmit a resultant signal by wireless;
   a receiver provided in each of said electric equipments and having a unit for receiving said control signal transmitted by wireless from said transmitter and identifying said ID added to said control signal; and
   a control switch provided in each of said electric equipments and adapted to control each of said electric equipments in accordance with said control signal received by said receiver.

3. The intra-vehicle LAN system according to claim 2, wherein said electric equipment control unit further comprises:
   detection means for detecting a control state of each of said electric equipments; and
   state signal generation means for generating a state signal corresponding to said detected control state of each of said electric equipments and outputting said state signal to said electric power supply line towards a side of said main controller.

* * * * *